US00RE37590E

(19) United States
(12) Reissued Patent
Leyden et al.

(10) Patent Number: US RE37,590 E
(45) Date of Reissued Patent: Mar. 19, 2002

(54) RETRACTABLE SENSOR FOR AN ALARM SYSTEM

(75) Inventors: Roger J. Leyden, Willow Springs; Terrance J. Surma, Bloomingdale, both of IL (US)

(73) Assignee: Se-Kure Controls, Inc., Franklin Park, IL (US)

( * ) Notice: This patent issued on a continued prosecution application filed under 37 CFR 1.53(d), and is subject to the twenty year patent term provisions of 35 U.S.C. 154(a)(2).

(21) Appl. No.: 08/807,120

(22) Filed: Feb. 19, 1997

Related U.S. Patent Documents

Reissue of:
(64) Patent No.: 5,552,771
Issued: Sep. 3, 1996
Appl. No.: 08/258,663
Filed: Jun. 10, 1994

(51) Int. Cl.[7] ..... G08B 13/14
(52) U.S. Cl. ..... 340/568; 340/548; 340/563.4; 340/571; 340/665
(58) Field of Search ..... 340/568, 691, 340/651, 652, 665, 548, 571; 200/61.13, 61.93; 191/12.1 R, 12.2 R, 12.4

(56) References Cited

U.S. PATENT DOCUMENTS

| | | | | |
|---|---|---|---|---|
| 2,821,453 | A | 1/1958 | Jessen | |
| 2,821,579 | A | 1/1958 | Benjamin | |
| 2,937,396 | A | 5/1960 | Momberg et al. | |
| 3,617,659 | A | 11/1971 | Freeman | 191/12.1 R |
| 3,657,491 | A | 4/1972 | Ryder et al. | 191/12.2 R |
| 3,705,962 | A | 12/1972 | Banister | 191/12.4 |
| 3,773,987 | A | 11/1973 | Davis et al. | 191/12.4 |
| 3,782,654 | A | 1/1974 | Kasa | 242/388.1 |
| 3,812,307 | A | 5/1974 | Wagner et al. | 200/52 R |
| 3,858,011 | A | 12/1974 | Salvin et al. | 191/12.2 R |
| 3,929,210 | A | 12/1975 | Cutler et al. | 191/12.2 R |
| 4,008,791 | A | 2/1977 | Shafii-Kahany et al. | 191/12.2 R |

(List continued on next page.)

FOREIGN PATENT DOCUMENTS

| | | |
|---|---|---|
| DE | 3518157 | 11/1986 |
| EP | 0063313 | 10/1982 |
| FR | 2549308 | 1/1985 |

OTHER PUBLICATIONS

IBM Technical Disclosure Bulletin, W.L. Dollenmayer, "Cable Storage Reel" vol. 6, No. 7, p. 69–70, Dec. 1963.

*Primary Examiner*—Michael Horabik
*Assistant Examiner*—Albert K. Wong
(74) *Attorney, Agent, or Firm*—Wood, Phillips, VanSanten, Clark & Mortimer

(57) ABSTRACT

A retractable sensor assembly for use with an alarm system to prevent theft of valuable products while eliminating the problem of entangled and unsightly sensor cords is disclosed. The retractable sensor allows the user to grasp the product and pull it to a comfortable position. The invention consists of a housing, a retraction means contained in the housing, a sensor having two states, 1) secured when attached to the product and 2) unsecured when detached from the product, a multiconductor cable having a first end connected to the sensor, cooperating with the retraction means and a second end extending out of the housing, where the retraction means urges the sensor to the housing, yet allows the sensor to be pulled from the housing when an external force is exerted on the sensor, while maintaining a continuous electrical path from the first, sensor end of the cable to the second end of the cable.

14 Claims, 4 Drawing Sheets

U.S. PATENT DOCUMENTS

| | | | | | |
|---|---|---|---|---|---|
| 4,141,438 | A | | 2/1979 | Diem | 191/12.4 |
| 4,384,688 | A | | 5/1983 | Smith | 242/378.2 |
| 4,485,278 | A | | 11/1984 | Schaller et al. | 191/12.4 |
| 4,499,341 | A | | 2/1985 | Boyd | 191/12.4 |
| 4,616,113 | A | * | 10/1986 | Jank | 340/568 |
| 4,746,766 | A | | 5/1988 | Soulard | 174/36 |
| 4,757,955 | A | | 7/1988 | Simmons | 191/12.2 R |
| 4,772,878 | A | * | 9/1988 | Kane | 340/568 |
| 4,896,140 | A | * | 1/1990 | Biever | 340/568 |
| 4,989,805 | A | | 2/1991 | Burke | 242/378.2 |
| 5,003,292 | A | * | 3/1991 | Harding | 340/568 |
| 5,008,487 | A | | 4/1991 | Shimmyo | 174/35 R |
| 5,072,213 | A | * | 12/1991 | Close | 340/568 |
| 5,094,396 | A | | 3/1992 | Burke | 242/378.2 |
| 5,124,685 | A | * | 6/1992 | Rankin | 340/568 |
| 5,172,098 | A | * | 12/1992 | Leyden | 340/568 |
| 5,289,559 | A | * | 2/1994 | Wilson | 340/568 |
| 5,332,171 | A | | 7/1994 | Steff | 242/378 |
| 5,341,124 | A | * | 8/1994 | Leyen | 340/568 |
| 5,535,960 | A | | 7/1996 | Skowronski et al. | 242/378.4 |

* cited by examiner

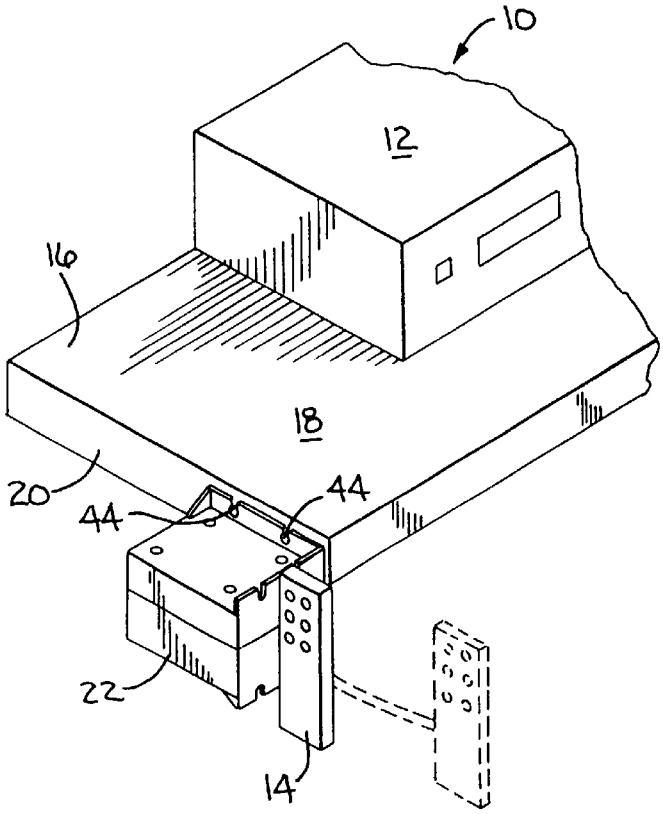
FIG. 1
FIG. 2
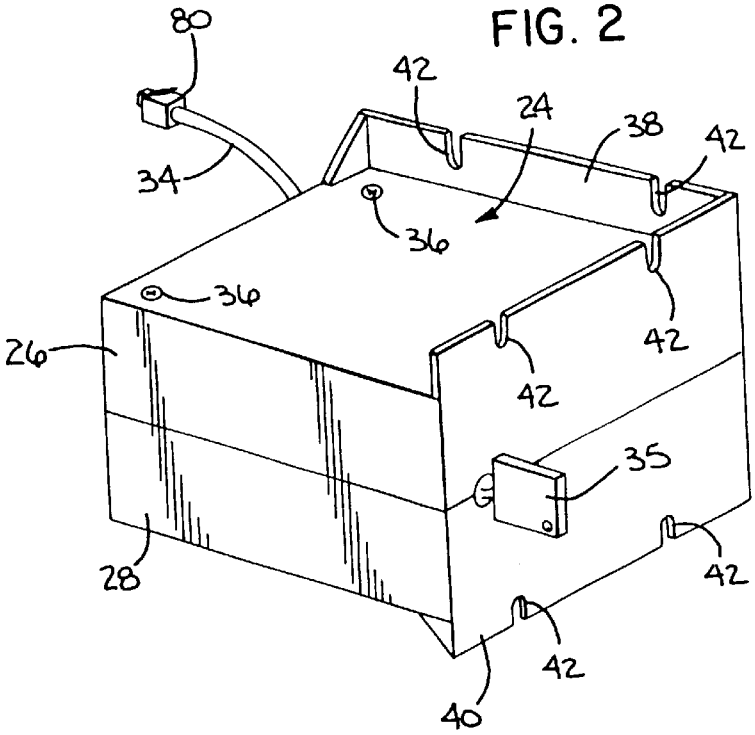

RETRACTABLE SENSOR FOR AN ALARM SYSTEM

Matter enclosed in heavy brackets [ ] appears in the original patent but forms no part of this reissue specification; matter printed in italics indicates the additions made by reissue.

FIELD OF THE INVENTION

The present invention relates to security alarms and anti-theft devices and, particularly, to an improved sensor design which allows limited freedom of movement of a consumer item to which it is attached.

BACKGROUND OF THE INVENTION

In recent years, retail and wholesale merchandisers have directed substantial attention to the nagging and costly problem associated with the theft and/or damage of costly display products on their premises. With the advent of smaller and more portable electronic apparatus, the ease with which pilferers and shoplifters can quickly and easily remove such goods from display cases and display racks has intensified. At the same time, the availability of new products, such as video cassette recorders, small portable radios and televisions, calculators and the like has skyrocketed, resulting in more and more valuable products being taken or tampered with. As locks and other security devices have become more sophisticated, so too have the individuals and methods for circumventing the operation of conventional security devices and, particularly, alarm sensing devices. The alarm system described in U.S. Pat. No. 5,172,098, to Leyden, has solved many of these problems. Some products, such as remote controls, are designed to be held and moved about. A sensor which can move freely with the product for a limited distance but returns the product and sensor to a set position when not being handled by a customer is optimal.

SUMMARY OF THE INVENTION

The above invention is specifically directed to overcoming the above problems in a novel and simple manner. The invention is particularly directed to use with remote controls but is not limited to this use.

According to the present invention, a retractable sensor is provided for use with an alarm system to prevent the theft of valuable products, such as video cassette recorders, small portable radios and televisions. The retractable sensor consists of a housing, a retraction device contained in the housing, a sensor having two states, 1) secured when attached to the product and 2) unsecured when detached from the product, and a multiconductor cable with one end attached to the sensor, then extending into the housing, cooperating with the retraction device and the second end extending out of the housing, the retraction device urging the sensor to the housing, yet allowing the sensor to be pulled from the housing when an external force is exerted on the sensor while maintaining a continuous electrical path from the first end to the second end of the cable.

Preferably, the sensor has an indicating device on its housing for displaying the state of the sensor. In a highly preferred form, the indicator is a light-emitting diode.

One embodiment uses a phone cord as the multiconductor cord.

Preferably the second end of the cable contains a connecting device to mate with an alarm system, such as the alarm system described in U.S. Pat. No. 5,172,098.

A preferred form of the invention has a retraction structure consisting of a spool mounted for rotation in the housing on which the multiconductor cable is wound and a device operatively associated with the spool for urging the spool in a direction to wind the cable onto the spool, yet permitting the unwinding of the cable when a user pulls the product, attached to the cable by the sensor, away from the housing.

With the above apparatus, the user can grasp and pull a product to a comfortable position. But if the user attempts to detach the product from the sensor, the alarm system detects this and warns the merchant.

BRIEF DESCRIPTION OF THE DRAWINGS

FIG. 1 is a partial perspective view of a shelf with an electronic device thereon, a remote control for operating the electronic device and a retractable sensor according to the present invention attached to the remote control for allowing movement of the remote control from the solid position of FIG. 1 to the phantom line position;

FIG. 2 is an enlarged perspective view of the retractable sensor according to the present invention;

DETAILED DESCRIPTION OF THE DRAWINGS

Figure 3:
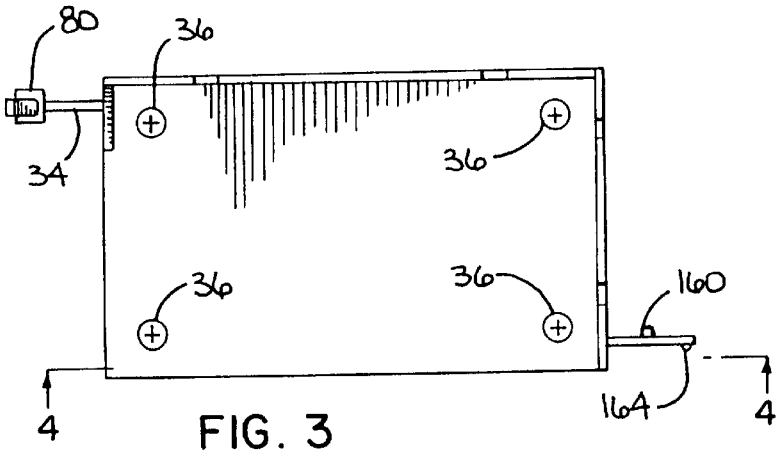
FIG. 3 is a top view of the retractable sensor with a remote control attached thereto and shown in phantom.
Figure 4:
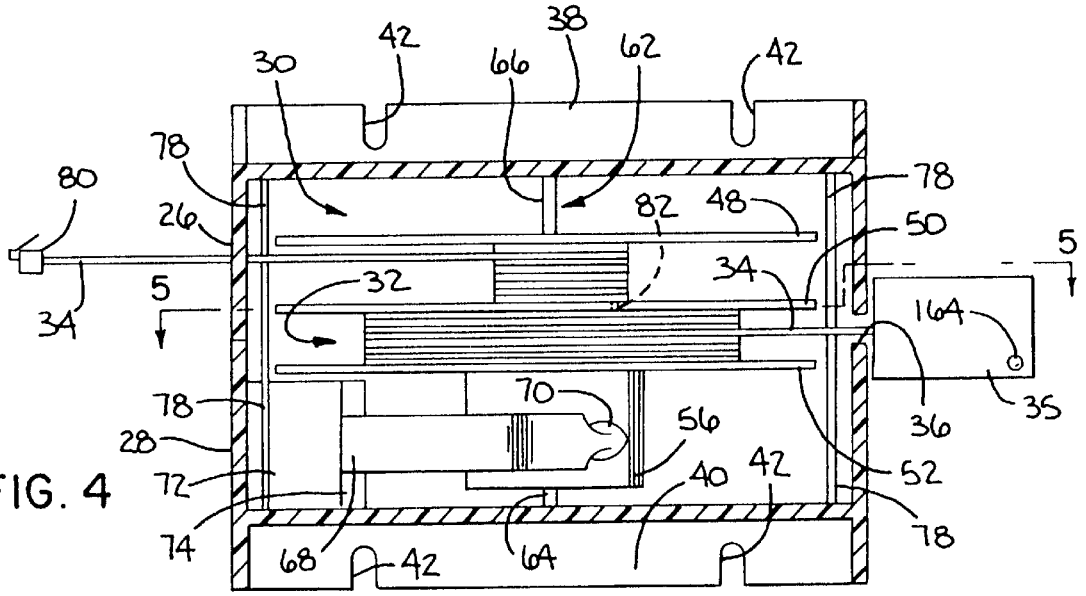
FIG. 4 is a sectional view of the retractable sensor taken along line 4—4 of FIG. 3.

The disclosed invention is shown as used with a remote control for an electronic device. The invention can be used with a wide variety of products and the choice of a remote control is just for convenience. It is understood that the particular product used to illustrate the invention is shown by way of example only and not as a limitation of the invention.

In FIG. 1, a typical point-of-purchase display is shown at 10 for an electronic device 12 which is operable through a portable, hand-held control 14 from a location remote from the device 12. A display shelf 16 defines an upwardly-facing surface 18 for supporting the device 12. The shelf 16 has a peripheral, vertically- extending edge 20 to which the remote control 14 is attached through a retractable sensor assembly 22, according to the present invention. The retractable sensor assembly 22 is designed to allow free movement of the remote control 14 thereon from the stored/solid line position of FIG. 1, to the phantom position in FIG. 1, wherein it can be conveniently manipulated by the consumer.

The details of the retractable sensor assembly 22 are shown in FIGS. 2–6. The retractable sensor assembly 22 consists of a rectangular housing 24 defined by first, and second housing parts 26, 28 respectively. The first and second housing parts 26, 28, operatively connected as in FIGS. 2–4, define an internal space 30 which contains a retraction mechanism at 32 for a multiconductor cable 34, see FIG. 4. A sensor 35 is connected to the cable 34 and attaches to the remote control 14. For a description of several methods of attaching the sensor to a product, see U.S. Pat. No. 5,172,098 which is incorporated herein by reference.

The first and second housing parts 26, 28 are held together by a plurality of screws 36. To facilitate anchoring of the housing 24, flanges 38, 40 are integrally formed thereon and have openings 42 therein to accept conventional fasteners, such as screws and nails 44 (FIG. 1).

A plurality of threaded posts 78 are provided for the screws 36 to secure the two housing parts 26, 28. The posts 78 are made of two halves, one half extending from housing part 26 and the other half extending from housing part 28 and meeting in the middle.

Figure 5:
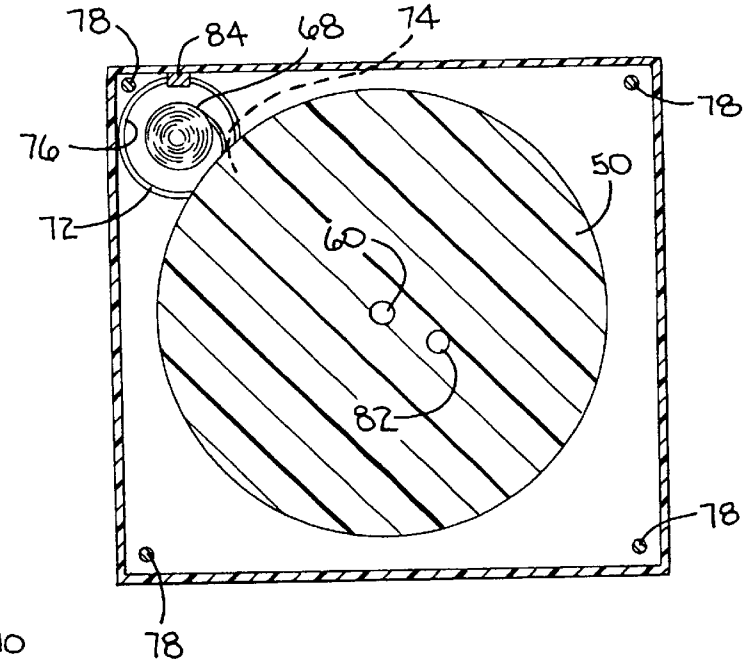
FIG. 5 is a sectional view of the retractable sensor taken along line 5—5 of FIG. 4.
Figure 6:
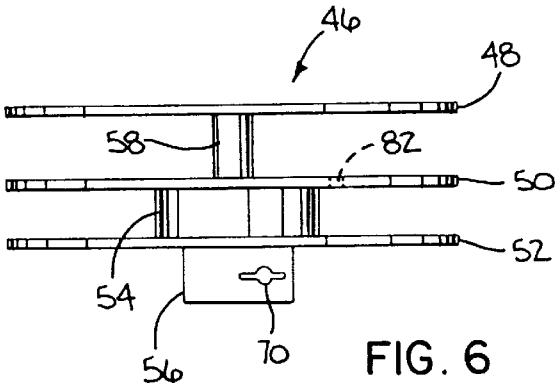
FIG. 6 is a side view of the pulley as used in the retractable sensor of the present invention.

The retraction mechanism 32 has a double pulley 46, with a top disk 48, middle disk 50 and bottom disk 52. The double pulley 46 has three hubs with three different radii, a sensor hub 54, a recoil hub 56 and an alarm system hub 58. In the preferred embodiment the radius of the alarm system hub 58 is smaller than the sensor hub 54. The double pulley 46 has a tube 60 running through the center of the hubs 54, 56, 58, as shown in FIG. 5. The double pulley 46 rotates around a rod 62 (see FIG. 4) which is formed by a male post 64, attached to the housing part 28, mating with a female post 66, attached to the housing part 26.

A coil spring 68 attaches to the double pulley 46 at the recoil hub 56. In an embodiment, the coil spring 68 has a T-shaped end (not shown) which is inserted in a slot 70 in the recoil hub 56. The end is then rotated so that it cannot be removed from the slot 70.

The coil spring 68 sits in a circular cup 72. The cup has an opening 74 through which the end of the coil spring 68 extends out onto the recoil hub 56. When the coil spring 68 is placed in the cup 72, it expands until it meets an interior surface 76 of the cup 72, where it is held. The opening 74 is chosen so that the coil spring 68 cannot pass through the opening 74 when the sensor 35 is fully extended.

The cable 34 is continuous through the housing 24, from the sensor 35 to a phone plug 80. From the sensor 35 the cable 34 winds around and spirals into the sensor hub 54. Then the cable 34 extends through a hole 82 (shown in FIGS. 4–6), near the edge of sensor hub 54, in middle disk 50 where the cable 34 winds around and spirals out from the alarm system hub 58, and then extends out of the housing 24 to the phone plug 80. The cable 34 is wrapped on the sensor hub 54 and the alarm system hub 58 in such a way that when the sensor 35 is pulled from the housing 24, the cable 34 unwinds around the alarm system hub 58 (i.e. the cable 34 unwinds from the hubs 54, 58 simultaneously). This unwinding results in the cable 34 forming a looser spiral around the alarm system hub 58. The cable 34 is prevented from extending out towards the phone plug 80 by a U-shaped catch 84. The catch 84 is designed so that cable 34 tightly engages the catch 84.

Figure 7:
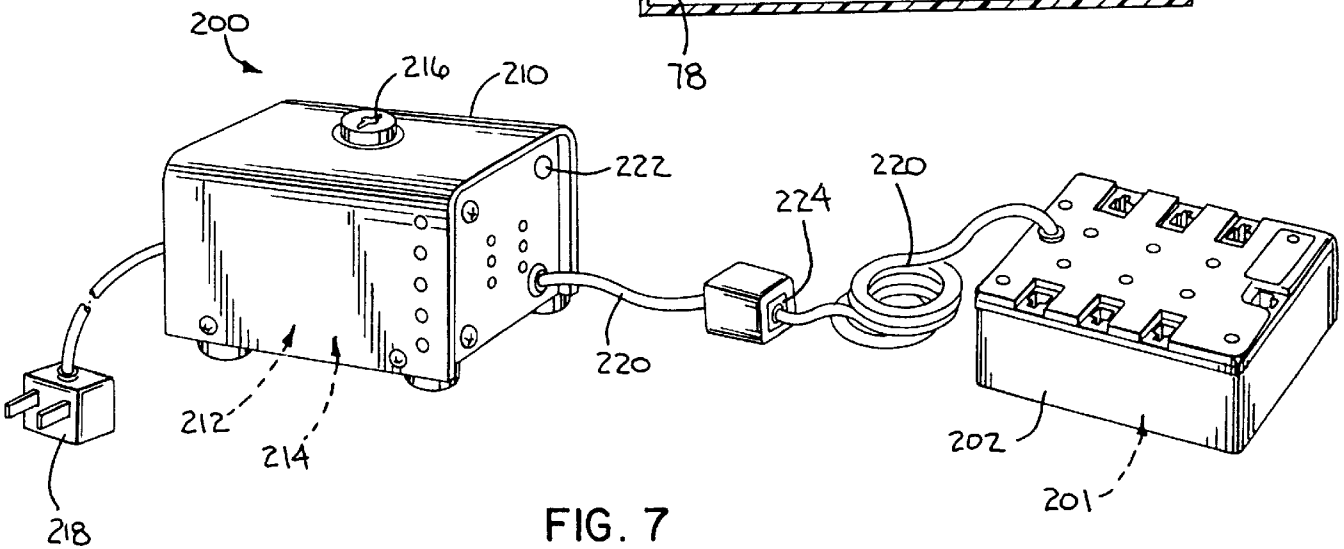
FIG. 7 is a perspective view of an alarm system which cooperates with the retractable sensor of the present invention.

The retractable sensor assembly 22 is designed to work with an alarm system 200 of FIG. 7. The retractable sensor assembly 22 has a cable 34 that mates with a splitter box 202 of the alarm system 200. The details of the alarm system are described in U.S. Pat. No. 5,172,098.

Figure 9:
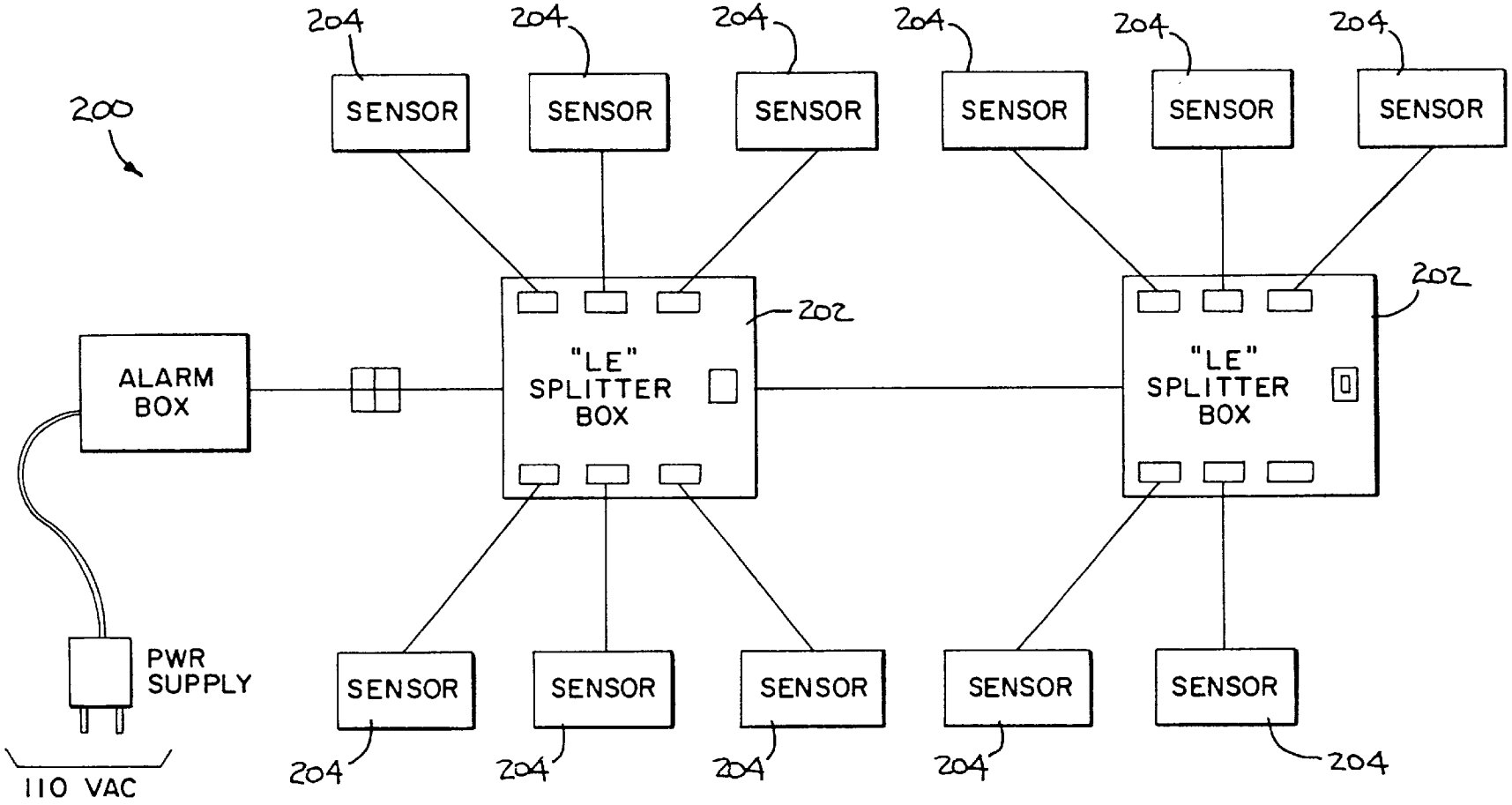
FIG. 9 is a schematic view of the alarm system shown in FIG. 7.

Each splitter box 202 can control up to six sensors 204 as best seen in FIG. 9. The splitter boxes 202 can be daisy-chained to add additional sensors 204. The sensors 204 can be the retractable sensor assembly 22 disclosed herein or any of the variety of sensors described in U.S. Pat. No. 5,172,098.

The alarm system 200 includes an alarm housing 210 enclosing an alarm circuit 212 having a horn 214. A lock 216 enables and disables the alarm circuit 212 via a key (not shown). An AC adapter 218 provides a nine volt DC voltage from a 110 VAC source. The electrical cord 220 connects the alarm circuit 212 to the splitter box 202. The alarm housing 210 also includes an LED 222 in addition to the horn 214 to indicate the state of the alarm circuit 212. The electrical cord 220 may consist of a phone cord and include a connector 224 (one shown), one from the splitter box 202 and the other form the alarm circuit 212.

Figure 8:
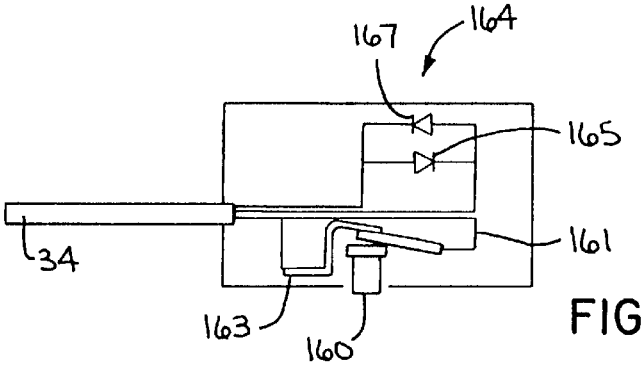
FIG. 8 is a partial schematic view of the retractable sensor showing one embodiment of the sensor.

FIG. 8 shows a schematic view of the sensor 35. When the sensor 35 is adhered to the remote control 14 the button 160 is depressed as shown in FIG. 8 and FIG 3. The depression of button 160 causes a first conductor 161 to come into contact with a second conductor 163 to complete an electrical circuit. Due to the completion of the electrical circuit, a detector circuit 201, contained in the splitter box 202 (as shown in FIG. 7), determines that the sensor 35 is attached to the remote control 14. The detector circuit 201 is described in U.S. Pat. No. 5,172,098 which is incorporated by reference herein. The detector circuit 201 induces an electrical current to flow in one direction through indicator 164. Since the indicator 164 has two LED's 165,167 connected in antiparallel, one of the LED's 165 is conducting and emits red light. The red light indicates the sensor 35 is in the secured state. Alternatively, when the sensor 35 is removed from the remote control, the button 160 is released and the first conductor 161 breaks contact with the second conductor 163 to break the electrical circuit. The detector circuit 201 induces an electrical current to flow in a second direction through the indicator 164. This results in LED 167 conducting and emitting a green light, which indicates the sensor 35 is in the unsecured state.

With the above structure, it can be seen that consumers can conveniently grasp the remote control 14 and operate it in a normal manner. At the same time, the merchant is afforded the security of knowing that the remote control 14 cannot be removed from the premises. The device can be made sufficiently low in cost that it can be affordably purchased and used for even low-price remote controls.

The foregoing disclosure of specific embodiments is intended to be illustrative of the broad concepts comprehended by the invention and is not intended to limit the scope of the invention.

We claim:

1. A retractable sensor assembly, as used with an alarm system, comprising;

a housing;

means for retraction contained in said housing;

a sensor having two states, 1) secured when attached to a product and 2) unsecured when detached from said product, said sensor being outside the housing;

a multiconductor cable, having a first end attached to the sensor then extending into the housing, cooperating with the retraction means and a second end extending out of the housing;

said retraction means urging the cable into the housing and thereby urging the sensor to the retraction means, yet allowing the sensor to be pulled from the housing when an external force is exerted on the sensor, while maintaining a continuous electrical path from the first, sensor end of the cable to the second end of the cable; and means for connecting said second end of the cable to an alarm system able to detect if said sensor is in the secured or unsecured state, whereby a user can grasp and pull on a product attached to the sensor to place the product in a comfortable position, but if the user detaches the product from the sensor the alarm system detects the unsecured state.

2. The retractable sensor assembly of claim 1 wherein said sensor has an indicating means for indicating the state of the sensor.

3. The retractable sensor assembly of claim 2 wherein said indicating means is a light-emitting diode.

4. The retractable sensor assembly of claim 1 wherein said multiconductor cable is a phone cord.

5. The retractable sensor assembly of claim 1 wherein said retraction means includes;

a spool mounted in the housing upon which said multiconductor cable is wound; and biasing means operatively associated with said spool in said housing for urging said spool in a direction to wind the cable on the spool, yet to permit unwinding of the cable when an external force is exerted on the sensor.

6. A retractable sensor assembly, as used with an alarm system, comprising;

a housing;

a pulley mounted for rotation in said housing, having a pair of hubs, a sensor hub and an alarm system hub, and a disk between the sensor and the alarm system hub has a hole;

a multiconductor cable wound about the sensor hub through said hole in said disk and then wound around the alarm system hub of said pulley, the cable having opposite near and remote ends;

a sensor, outside the housing, connected to the remote end of said cable and being attachable to a product, said sensor having two states, 1) secured when attached to the product and 2) unsecured when detached from the product, and the sensor including means for electrically connecting or disconnecting conductors in said cable according to the state of the sensor;

biasing means operatively associated with said pulley in said housing for urging said pulley and the pair of hubs in a direction to wind the cable around the sensor hub and thereby pull the sensor to the housing yet to permit the sensor to extend from the housing when an external force is exerted on the sensor; and a connector, outside the housing, attached to the near end of the cable, for connecting to an alarm system, whereby a user can grasp and pull on a product attached to the sensor to place the product in a comfortable position, but if the user detaches the product from the sensor the alarm system detects the unsecured state.

7. The retractable sensor assembly of claim 6 wherein said sensor includes a means for visually indicating whether the sensor is in the secured or unsecured state.

8. The retractable sensor assembly of claim 7 wherein said indicating means is a light-emitting diode.

9. The retractable sensor assembly of claim 6 in combination with a product and including means for attaching the sensor to the product so that the sensor is in the secured state.

10. The retractable sensor assembly of claim 9 wherein the sensor and cable are the only elements connecting between the product and housing.

11. A retractable cable assembly, as used with an alarm system, comprising;

a housing;

means for retraction contained in said housing;

a multiconductor cable, having a first end attached to a *sensor attachable to a* product then extending into the housing, cooperating with the retraction means and a second end extending out of the housing, *said sensor having two states, 1) secured when attached to the product with at least two conductors of the cable electrically connected and 2) unsecured when detached from the product with said at least two conductors electrically disconnected*;

said retraction means urging the cable into the housing and thereby urging the first end connected to [a product] *the sensor* to the retraction means, yet allowing the first end to be pulled from the housing when an external force is exerted on the first end, while maintaining a continuous electrical path *in said at least two conductors* from the first end of the cable to the second end of the cable; and means for connecting the second end of the cable to an alarm system which detects a) [a] *the* secured state with the [electrical path continuous between the first and second ends of the cable] *at least two conductors of the cable electrically connected* and b) an unsecured state with the [continuity of the electrical path between the first and second cable ends broken] *at least two conductors of the cable electrically disconnected*, whereby a user can grasp and pull on a product attached to the first cable end to place the product in a comfortable position, but if the user breaks the [continuity of the electrical path] *electric connection of the at least two conductors of the cable* the alarm system detects the unsecured state.

*12. A retractable cable assembly, as used with an alarm system, comprising;*

*a housing;*

*a cable having first and second conductors extending between opposite first and second ends of said cable;*

*means for attaching said cable first end to a product;*

*means for electrically connecting said first and second conductors at said first end of said cable whereby 1) said first and second conductors form an alarm loop extending from said cable second end through said first conductor to said cable first end and back through said second conductor to said cable second end when said attaching means attach said cable to a product and 2) said alarm loop is broken by detaching said cable from a product;*

*a connector for connecting said cable second end to an alarm system responsive to any break of the alarm loop; and*

*a retracting mechanism in said housing continuously urging the cable first end toward the housing yet allowing the cable first end to be pulled away from the housing when an external force is exerted on the cable first end.*

*13. The retractable cable assembly of claim 12, wherein said retracting mechanism continuously urges the cable first end toward the housing, whereby a user can grasp and pull on a product attached to the cable first end to place the product in a comfortable position with a minimum amount of cable extending from said housing.*

*14. The retractable cable assembly of claim 13, wherein said retracting mechanism comprises:*

*a pulley mounted for free rotation relative to said housing and including a sensor hub and an alarm system hub separated by a disk, said disk having a hole therein, whereby said cable extends from said cable first end into said housing where it winds around said sensor hub then extends through said pulley disk hole and winds about said alarm system hub then extends from said housing to said cable second end; and*

*a spring continuously biasing said pulley toward winding said cable onto said sensor hub.*

* * * * *